United States Patent [19]

Chaplin

[11] Patent Number: 4,887,159
[45] Date of Patent: Dec. 12, 1989

[54] SHADOW VISUAL EFFECTS WIPE GENERATOR

[75] Inventor: Daniel J. Chaplin, Nevada City, Calif.

[73] Assignee: The Grass Valley Group Inc., Nevada City, Calif.

[21] Appl. No.: 323,057

[22] Filed: Mar. 14, 1989

Related U.S. Application Data

[63] Continuation of Ser. No. 203,602, Jun. 2, 1988, abandoned, which is a continuation of Ser. No. 30,937, Mar. 26, 1987, abandoned.

[51] Int. Cl.⁴ .............................................. H04N 5/22
[52] U.S. Cl. ................................... 358/183; 358/181; 358/185
[58] Field of Search ................. 358/183, 182, 180, 22, 358/185, 181

[56] References Cited

U.S. PATENT DOCUMENTS

| | | | |
|---|---|---|---|
| 2,193,869 | 3/1940 | Goldsmith | 358/183 |
| 2,240,420 | 4/1941 | Schnitzer | 358/183 |
| 2,613,263 | 10/1952 | Hilburn | 358/183 |
| 2,653,186 | 9/1953 | Hurford | 358/183 |
| 2,784,246 | 3/1957 | Hurford | 358/183 |
| 3,006,993 | 10/1961 | Barndt | 358/183 |
| 3,371,160 | 2/1968 | Hurford | 358/183 |
| 3,671,667 | 6/1972 | Thorpe | 358/183 |
| 3,689,694 | 9/1972 | Thorpe | 358/183 |
| 3,821,468 | 6/1974 | Busch | 358/183 |
| 4,041,527 | 8/1977 | Rayner et al. | 358/22 |
| 4,086,619 | 4/1978 | Miyake et al. | 358/183 |
| 4,121,253 | 10/1978 | McCoy | 358/183 X |
| 4,178,613 | 12/1979 | Takahashi et al. | 358/22 X |
| 4,199,788 | 4/1980 | Tsujimura | 358/183 |
| 4,199,790 | 4/1980 | Greenfield et al. | 358/182 X |
| 4,200,890 | 4/1980 | Inaba et al. | 358/183 |
| 4,223,351 | 9/1980 | Tsujimura et al. | 358/182 |
| 4,356,511 | 10/1982 | Tsujimura | 358/182 X |
| 4,395,733 | 7/1983 | Elenbaas | 358/22 X |
| 4,409,618 | 10/1983 | Inaba et al. | 358/183 |
| 4,591,913 | 5/1986 | Pohl | 358/183 |
| 4,689,681 | 8/1987 | Jackson | 358/183 |
| 4,694,343 | 9/1987 | Flora | 358/183 |
| 4,694,344 | 9/1987 | Flora | 358/183 |
| 4,698,666 | 10/1987 | Lake, Jr. et al. | 358/183 X |
| 4,713,695 | 12/1987 | Macheboeuf | 358/183 |
| 4,758,892 | 7/1988 | Bloomfield | 358/183 |
| 4,782,392 | 11/1988 | Haycock et al. | 358/183 |

*Primary Examiner*—James J. Grody
*Assistant Examiner*—Mark P. Powell
*Attorney, Agent, or Firm*—Francis I. Gray; John Smith-Hill

[57] ABSTRACT

Video effects apparatus comprises a pattern generator for generating a mix control signal which, when used to control the combination of first and second input video signals to provide an output video signal, defines the geometrical shape in a composite output scene of a transition between a first component scene represented by the first input video signal and a second component scene represented by the second video signal. The pattern generator responds to a size control signal by causing the mix control signal to vary in a manner such that the area of the composite output video scene that is occupied by the first component scene changes relative to the area of the second component scene while the geometrical shape of the transition between the component scenes remains the same. A shadow generator generates a signal which adjusts the visual characteristics of the second component scene synchronously with the variation of the control signal.

6 Claims, 1 Drawing Sheet

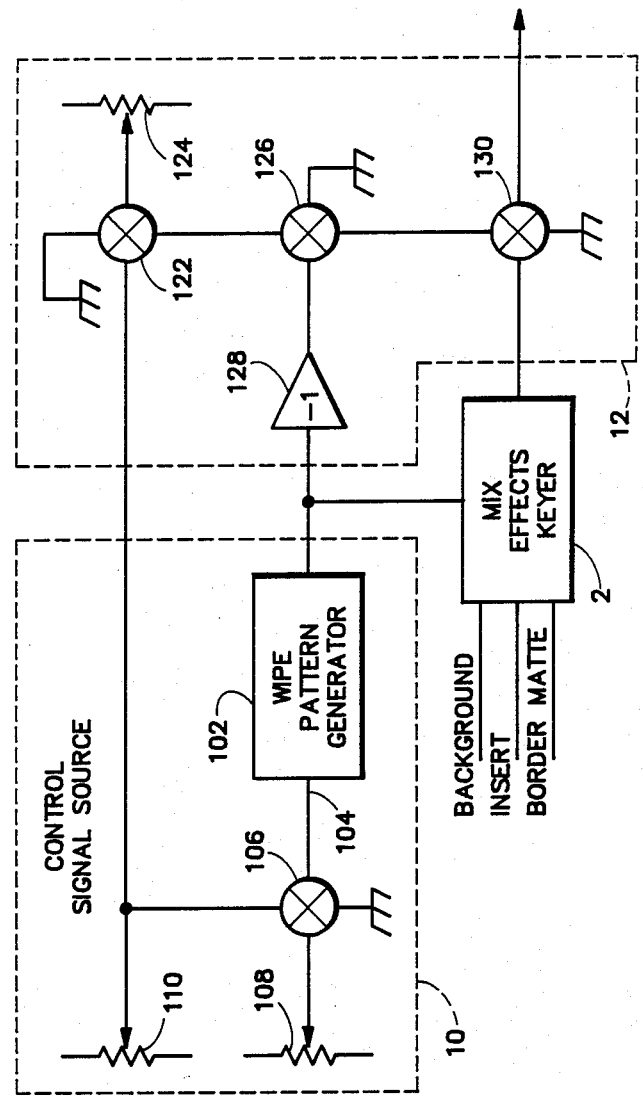

SHADOW VISUAL EFFECTS WIPE GENERATOR

This is a continuation of applicatiom of Ser. No. 203,602 filed June 2, 1988 and now abandoned, which is a continuation of 30,937, 3/26/87, abandoned.

This invention relates to video special effects apparatus.

BACKGROUND OF THE INVENTION

A wipe effect is carried out using a production switcher which receives first and second synchronized video signals (video 1 and video 2) by generating a control signal which is synchronized to the video signals and varies in a predetermined fashion between two exteme values, which may be represented as one and zero. For example, in the case of a horizontal wipe, in which the transition between two input scenes appears as a vertical line or stripe which moves across the output scene from one side to the other, the control signal has a ramp waveform which repeats at line rate, the start point of the ramp progressing through the line interval from field to field. In a preset pattern wipe, the control signal is designed so that a selected portion of the background scene (video 1) is replaced by the corresponding portion of an insert scene (video 2), and the size of the area of the output scene that is occupied by the insert scene increases to a preset limit while its geometrical shape remains the same.

The output signal video C of a video mixer which receives the video signals video A and video B and a control signal may be expressed as $$video\ C = control \times video\ A + (1\text{-}control) \times video\ B$$

If video B represents black (which may be achieved by grounding the video B input terminal of the mixer) and the value of the control signal is increased from zero to one, the video C scene is a progressively darker replica of the video A scene. Mixing of a video signal to ground in this manner can be used to provide a shadow effect.

SUMMARY OF THE INVENTION

A preferred embodiment of the present invention is video effects apparatus comprising a pattern generator for generating a mix control signal which, when used to control the combination of first and second input video signals to provide an output video signal, defines the geometrical shape in a composite output scene of a transition between a first component scene represented by the first input video signal and a second component scene represented by the second video signal. The pattern generator responds to a size control signal by causing the mix control signal to vary in a manner such that the area of the composite output video scene that is occupied by the first component scene changes relative to the area of the second component scene while the geometrical shape of the transition between the component scenes remains the same. A shadow generator generates a signal which adjusts the visual characteristics of the second component scene synchronously with the variation of the control signal.

BRIEF DESCRIPTON OF THE DRAWINGS

For a better understanding of the invention, and to show how the same may be carried into effect, reference will now be made, by way of example, to the accompanying drawing, the single FIGURE of which is a block diagram of a mix effects keying apparatus.

DETAILED DESCRIPTION

The mix effects keying apparatus illustrated in the drawing comprises a mix effects keyer 2 which receives several video signals. These video signals include a background video signal, an insert video signal and a border matte video signal. The mix effects keyer also receives mix control signals from a control signal source 10 which includes a wipe pattern generator 102. The wipe pattern generator 102 generates a mix control signal which, when applied to the mix effects keyer 2, combines the insert video signal with the background video signal in a manner such that the output signal of the mix effects keyer represents a scene in which a portion of the background scene has been replaced by a corresponding portion of the insert scene. The voltage of the mix control signal varies between two levels which can be represented as zero, corresponding to 100% background, and one, corresponding to 100% insert. The geometrical shape of the portion of the background scene that has been replaced is determined by the waveform of the mix control signal which in turn depends on the nature of the pattern generator.

The pattern generator 102 has a size control input 104 at which it receives a size control signal. The size control signal is provided by a multiplier 106 which receives input signals from a preset size potentiometer 108 and a transition potentiometer 110. The size of the portion of the background scene defined by the mix control signal depends upon the voltage of the size control signal received at the input terminal 104. This voltage depends on the product of the voltage at the wiper of the preset size potentiometer 108 and the voltage at the wiper of the transition potentiometer 110. The range of output voltages provided by the potentiometer 108 represents the maximum range of sizes of the preset pattern that can be defined by the mix control signal. Normally, the potentiometer 108 is set before a mix effect is performed. The transition potentiometer 110 is driven by a lever arm and in order to carry out a mix effect it is normally driven through its full range from 0 v to a maximum value. Preferably, the multiplier 106 is such that the range of output voltages provided by the transition potentiometer 110 corresponds to a range of multipliers from zero to one, and accordingly the voltage at the size control terminal 104 has a range of values from zero to the voltage at the wiper of the potentiometer 108. Therefore, as the lever arm is swept from the position corresponding to a multiplier of zero to the position corresponding to a multiplier of one, the size of the portion of the background scene that is replaced by the corresponding portion of the insert scene increases from zero up to a maximum value determined by the setting of the potentiometer 108, while the geometrical shape of the area that is replaced remains the same, e.g. a circle or square. In a more complex form of control signal source, the wipe pattern generator 102 might provide two mix control signals for controlling mixing among the background video, the insert video and the border matte video, such that the portion of the insert scene that appears against the background scene is surrounded by a border matte of uniform color.

The manner of operation of the mix effect keyer and control signal source as described so far is conventional.

In addition to the conventional elements described above, the mix effects keying apparatus comprises a shadow control signal generator 12. The shadow control signal generator includes a multiplier 122 which has one input at which it receives the voltage provided by the transition potentiometer 110. The multiplier 122 has a second input which is connected to the wiper of a shadow density potentiometer 124. The multiplier 122 is such that the range of output voltages provided by the transition potentiometer 110 corresponds to a range of multipliers from zero to one, and therefore the output signal of the multiplier 122 has a range of voltages from zero up to the voltage at the wiper of the potentiometer 124 as the lever arm is swept through its range of movement. The output signal of the multiplier 122 is applied to one input of a second multiplier 126.

The mix control signal provided by the control signal source 10 is also applied to the shadow control signal generator 12. The mix control signal is received by an inverter 128 which provides an output signal which is the complement of the mix control signal. The output of the inverter 128 is applied to the second input of the multiplier 126, and accordingly the multiplier 126 provides an output signal which is the complement of the mix control signal but is scaled by the setting of the ptoentiometer 124 and by the position of the lever arm. If the voltage of the mix control signal corresponds to one, the output signal of the mixer 126 represents zero regardless of the potentiometer 124 and the position of the lever arm, whereas if the voltage of the mix control signal corresponds to zero, the output signal of the mixer 126 depends on the position of the lever arm control 110 and has a maximum value which depends on the setting of the potentiometer 124.

The output signal of the mixer 126 is applied to a further mixer 130. The mixer 130 receives the output signal of the mix effects keyer 2 at its second input, and its third input is grounded. Therefore, for portions of the scene for which the mix control signal is zero (i.e. 100% background), the output signal of the multiplier 130 corresponds to the input signal of the mixer, i.e. the background video signal, but attenuated in dependence upon the setting of the shadow density potentiometer 124 and the position of the lever arm control 110, so that the background scene is shadowed. For portions of the scene for which the mix control signal is one (i.e. 100% insert), the output signal of the mixer 126 is zero and therefore the output signal of the mixer 130 is the same as its input signal.

The illustrated production switcher may also be used to provide a spotlight affect, in which the field surrounding a selected area of a scene is faded so as to highlight the selected area. This is accomplished by using the same video signal for both the background video and the insert video. As the lever arm is moved from its zero multiplier position for its unity multiplier position, the field surrounding a progressively enlarging area of the scene becomes progressively darker, but the distribution of hue and saturation over the output scene is the same as the distribution of hue and saturation over the background scene.

It will be appreciated that the present invention is not restricted to the particular embodiment that has been described and illustrated, and that variations may be made therein without departing from the scope of the invention as defined in the appended claims and equivalents thereof. For example, the mixer 130 may be placed at the input of the mix effects keyer, so that the background scene is shadowed prior to insertion of the insert scene.

I claim:

1. An improved wipe generator of the type having means for generating mix control signals and means for combining video signals under control of the mix control signals to produce an output video signal, wherein the improvement comprises:
    means for generating a visual quality control signal in response to the mix control signals and a transition signal from the mix control signals generating means; and
    means for combining the visual quality control signal with one of the video signals so that a visual quality of the one video signal in the output video signal is adjusted to produce a visual effect output video signal.

2. An improved wipe generator as recited in claim 1 wherein the visual effect generating means comprises:
    means for combining the transition signal with a visual density signal to produce an intermediate visual signal;
    means for combining complements of the mix control signals with the intermediate visual signal to produce a visual signal; and
    means for combining the visual signal with the output video signal to produce the visual effect output video signal.

3. An improved wipe generator as recited in claim 1 wherein the visual effect generating means comprises:
    means for combining the transition signal with a visual density signal to produce an intermediate visual signal;
    means for combining complements of the mix control signals with the intermediate visual signal to produce a visual signal; and
    means for combining the visual signal with one of the video signals at the input of the video signals combining means so that the output video signal is the visual effect output video signal.

4. Video effects apparatus for use with a mixer, the mixer receiving a first input video signal representing a first scene and a second input video signal representing a second scene and providing an output video signal representing a composite scene, the video effects apparatus comprising:
    a pattern generator for generating a mix control signal which, when applied to the mixer, defines a geometrical shape in the composite scene of the transition between a portion of the first scene and a portion of the second scene,
    size control means for generating a size control signal which is applied to the pattern generator to cause an area of the composite scene that is occupied by the portion of the first scene to change relative to an area of the composite scene that is occupied by the portion of the second scene while the geometrical shape of the transition remains the same, and
    visual adjustment means for adjusting in response to the mix control signal and a transition signal from the size control means at least one visual quality of the area of the composite scene that is occupied by the portion of at least one of the first and second scenes concurrently with the change in the area of the composite scene that is occupied by the portion of the first scene, the visual adjustment means having first means for providing a preset quality signal representative of the maximum amount by which said visual quality of the portion of the second scene that appears in the composite scene is to be affected by the visual adjustment means, and having means for combining the preset quality signal with the transition signal to provide a visual quality control signal for combination with the area of the composite scene to affect the at least one visual quality.

5. Apparatus according to claim 4, wherein the first means of the size control means and the first means of the visual adjustment means each comprise a potentiometer, and the size control means and the visual adjustment means each also comprise a multiplier connected to receive both the transition signal and the signals provided by the respective potentiometers and provide an output signal which is proportional to the transition signal.

6. Apparatus according to claim 5, wherein the visual adjustment means comprise an inverter connected to receive the transition signal, a second multiplier connected to receive the output signal of the inverter and the output signal of the first-mentioned multiplier of the visual adjustment means, and a third multiplier for receiving the output video signal representing the composite scene, the third multiplier being connected to receive the output signal of the second multiplier.

* * * * *